(12) United States Patent
Raidel, II et al.

(10) Patent No.: US 7,607,670 B2
(45) Date of Patent: Oct. 27, 2009

(54) WEDGED AXLE CONNECTION

(75) Inventors: John Raidel, II, Springfield, MO (US);
Bruce Barton, Springfield, MO (US);
Mark Holt, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 442 days.

(21) Appl. No.: 11/407,813

(22) Filed: Apr. 20, 2006

(65) Prior Publication Data

US 2006/0237940 A1  Oct. 26, 2006

Related U.S. Application Data

(60) Provisional application No. 60/673,226, filed on Apr. 20, 2005.

(51) Int. Cl.
*B60G 1/00* (2006.01)
*B60G 3/00* (2006.01)
*B60G 9/00* (2006.01)

(52) U.S. Cl. .................. 280/124.11; 280/124.116; 280/124.128; 280/124.153

(58) Field of Classification Search ............ 280/85, 280/86.5, 786, 124.11, 124.111, 124.116, 280/124.121, 124.127, 124.128, 124.129, 280/124.153; 180/905, 906
See application file for complete search history.

(56) References Cited

U.S. PATENT DOCUMENTS

| | | | | |
|---|---|---|---|---|
| 2,059,167 A | * | 10/1936 | Bary | 384/158 |
| 2,737,907 A | * | 3/1956 | Janeway | 105/223 |
| 6,827,360 B2 | * | 12/2004 | Chan et al. | 280/124.116 |
| 2001/0020775 A1 | * | 9/2001 | Pierce et al. | 280/124.128 |
| 2001/0030406 A1 | * | 10/2001 | Pierce | 280/124.116 |
| 2003/0067134 A1 | * | 4/2003 | Galazin | 280/124.116 |
| 2004/0036246 A1 | * | 2/2004 | Chan et al. | 280/124.166 |
| 2005/0218620 A1 | * | 10/2005 | Reineck | 280/124.116 |
| 2005/0253351 A1 | * | 11/2005 | Pan et al. | 280/124.116 |
| 2006/0033302 A1 | * | 2/2006 | Saieg et al. | 280/124.128 |
| 2006/0033304 A1 | * | 2/2006 | Saieg et al. | 280/124.128 |
| 2006/0082094 A1 | * | 4/2006 | Mosler | 280/124.116 |
| 2006/0113741 A1 | * | 6/2006 | Chalin | 280/124.116 |
| 2006/0113742 A1 | * | 6/2006 | Chan et al. | 280/124.116 |
| 2006/0163834 A1 | * | 7/2006 | Brereton et al. | 280/124.128 |

* cited by examiner

*Primary Examiner*—Paul N. Dickson
*Assistant Examiner*—Barry Gooden, Jr.
(74) *Attorney, Agent, or Firm*—Lathrop & Gage LLP

(57) ABSTRACT

Provided are wedging and clamping mechanisms for securing an axle to a suspension member. The suspension member has a integral axle shell for seating the axle to be attached. An axle wedging shell is provided which mates to the axle shell via aligning angled grooves and flanges which, as the flanges are forced into the grooves, creates a significant clamping force trapping the axle in place. The orientation and placement of angled grooves and flanges varies through several embodiments. Some embodiments alternately use a retention plate. Adhesive may be applied to the axle and the inner surfaces of the axle shell and wedge member to limit axle twist or rotation.

16 Claims, 16 Drawing Sheets

WEDGED AXLE CONNECTION

RELATED APPLICATION

This application claims the priority of Ser. No. 60/673,226 filed Apr. 20, 2005 and incorporates the disclosure of the referenced application herein.

BACKGROUND

The present invention is directed to wedged axle connections for securely fastening an axle to a suspension assembly. More particularly, the attachment mechanism incorporates a combination of adhesive and mechanical fasteners which achieves the desired axle retention force by wedging two or more pieces of metal together to forcibly retain the axle in a desired position.

There have been developed numerous ways to attach an axle onto a suspension system. Virtually every vehicle suspension patent references or discusses a method for attaching an axle to the suspension. Generally, axles are secured to a suspension assembly with simple clamps, such as u-bolts or by welding the axle directly to a suspension member or a combination of both. Bolting an axle to a suspension system is a dated and limited method because it is difficult to achieve enough force to eliminate unwanted axle rotation and movement. This is particularly the case in large, heavy duty suspension systems such as on heavy trucks and trailers. Moreover, it is often necessary to combine retaining clamps which encircle a round axle with the bolts to achieve the requisite clamping force. For example, utilizing u-bolts to clamp a round axle into a semicircular axle seat may not eliminate axle twist and axle rotation. These assemblies are often cumbersome, heavy and difficult to remove after any significant road exposure.

Many manufacturers also weld axles directly to suspensions systems. A significant drawback to this method is that the weldment generates heat through the axle and the axle mounting surface which may weaken the metal structure. Welding axles to suspensions is also time consuming and significantly limits the ability to ship and assemble. Generally, welding the axle to the suspension is done by the manufacturer which then requires the suspensions to be shipped with axles in place. This increases shipping costs.

SUMMARY

The inventive wedge clamp mechanism disclosed herein incorporates ease of application, low cost and increased structural integrity over bolting, welding or a combination thereof. Generally, for each embodiment of the invention, a suspension control arm is provided with an integral axle shell for seating the axle to be attached. The axle shell is preferably semi-annular with an inner surface that is complementary to the outer surface of the axle.

An axle wedging shell is provided and also has an inner surface complementary to the outer surface of the axle and is also dimensioned to mate to the axle shell member so that the entire circumference of the axle is trapped between the axle shell and wedging shell. The wedging shell member and the axle shell member both preferably have inclined grooves or flange members which mate. For example, the axle shell may have two grooves, one positioned near each lateral edge of the shell. The wedging shell would then have two flanges, one near each lateral edge, which are received in the grooves of the axle shell.

An angle $\alpha$ of the groove in the axle shell along its length creates a ramp, or wedge. The groove angle is achieved by increasing the distance between the groove and the edge of the axle shell along the length of the groove. The flanges of the wedge shell are inserted into the grooves of the axle shell member and forced along the length of the groove creating an upward wedge force trapping the axle between the axle shell and wedge member. Prior to assembly, adhesive may be applied to the axle and the inner surfaces of the axle shell and wedge member to limit axle twist or rotation.

Different configurations of axle shell to axle wedge connections can be used to achieve wedge connections similar to that described above. For example, the grooves may be formed directly in the outer surface of the axle shell or wedge member. The flanges may also be integrally formed or may be manufactured separately and attached to the axle shell, axle wedge member or both.

In another embodiment of the invention, the axle shell member includes two arms projecting outward from the suspension control arm such that when the axle is positioned within the shell, the arms extend beyond the periphery of the axle. A slot is formed in each arm to receive a retention plate. After the axle is placed into the shell, the retention plate is positioned within the slots and can be retained therein by weldment or other fastening methods. The weldment would preferably be at the junction of the retention plate, axle shell and wedge shell which moves the heat of welding away from the axle itself. A wedge shell is provided to be forced between the retention plate and the axle. As the wedge shell is forced between the retention plate and axle, the retention force exponentially increases and axle rotation and twist is limited. Rotation will further be limited by applying adhesive between the axle and the wedge shell and/or the axle shell.

In another embodiment of the invention, the wedging shell member is formed from two separate pieces, preferably plate material conformed to the contour of the axle. Because the wedging shell is two pieces, two different angled grooves are provided in the axle shell. As previously described, flanges on each wedging shell are inserted into respective angled grooves in the axle shell. It is preferable that each wedge shell piece is wedged generally inward so that the pieces touch or are otherwise proximate a center point of the axle shell. A bolt or similar fastener may be used to secure the two wedging shell pieces together. Again, prior to assembly adhesive is applied between the axle shell and axle, the wedging shell pieces and the axle or a combination thereof.

According to an embodiment, an apparatus for connecting an axle to a suspension includes an axle shell and a wedging shell. The axle shell is connected to a suspension member and has an inner surface complementary to the axle. The axle shell has a first wedging member that includes a female groove or a male flange, and the axle shell has a second wedging member that includes a female groove or a male flange. The wedging shell has a first wedging member that includes a female groove or a male flange, and the wedging shell has a second wedging member that includes a female groove or a male flange. The first wedging member of the wedging shell is complementary to the first wedging member of the axle shell, and the second wedging member of the wedging shell is complementary to the second wedging member of the axle shell. The wedging shell is sized to receive the axle between the axle shell and the wedging shell when the first wedging member of the axle shell is coupled to the first wedging member of the wedging shell and the second wedging member of the axle shell is coupled to the second wedging member of the wedging shell.

DETAILED DESCRIPTIONS

Figure 1:
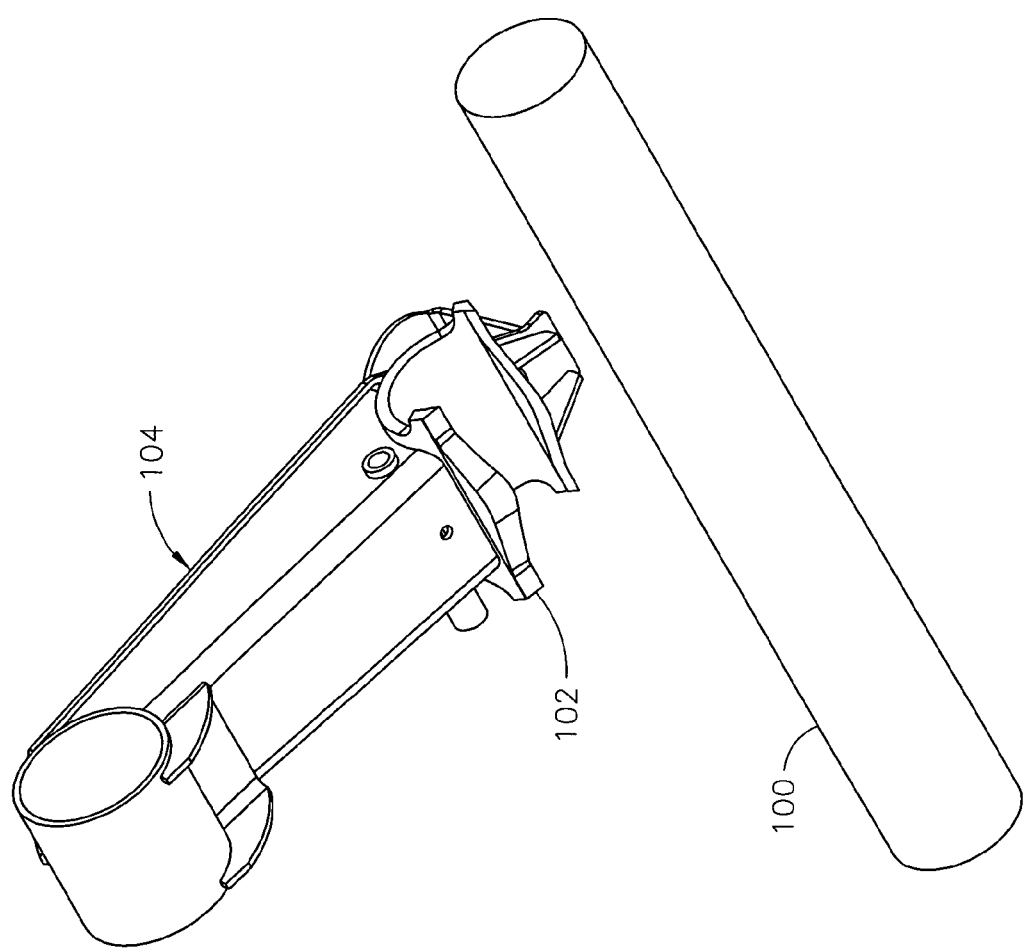
FIG. 1 is a partial view of related art.
Figure 2:
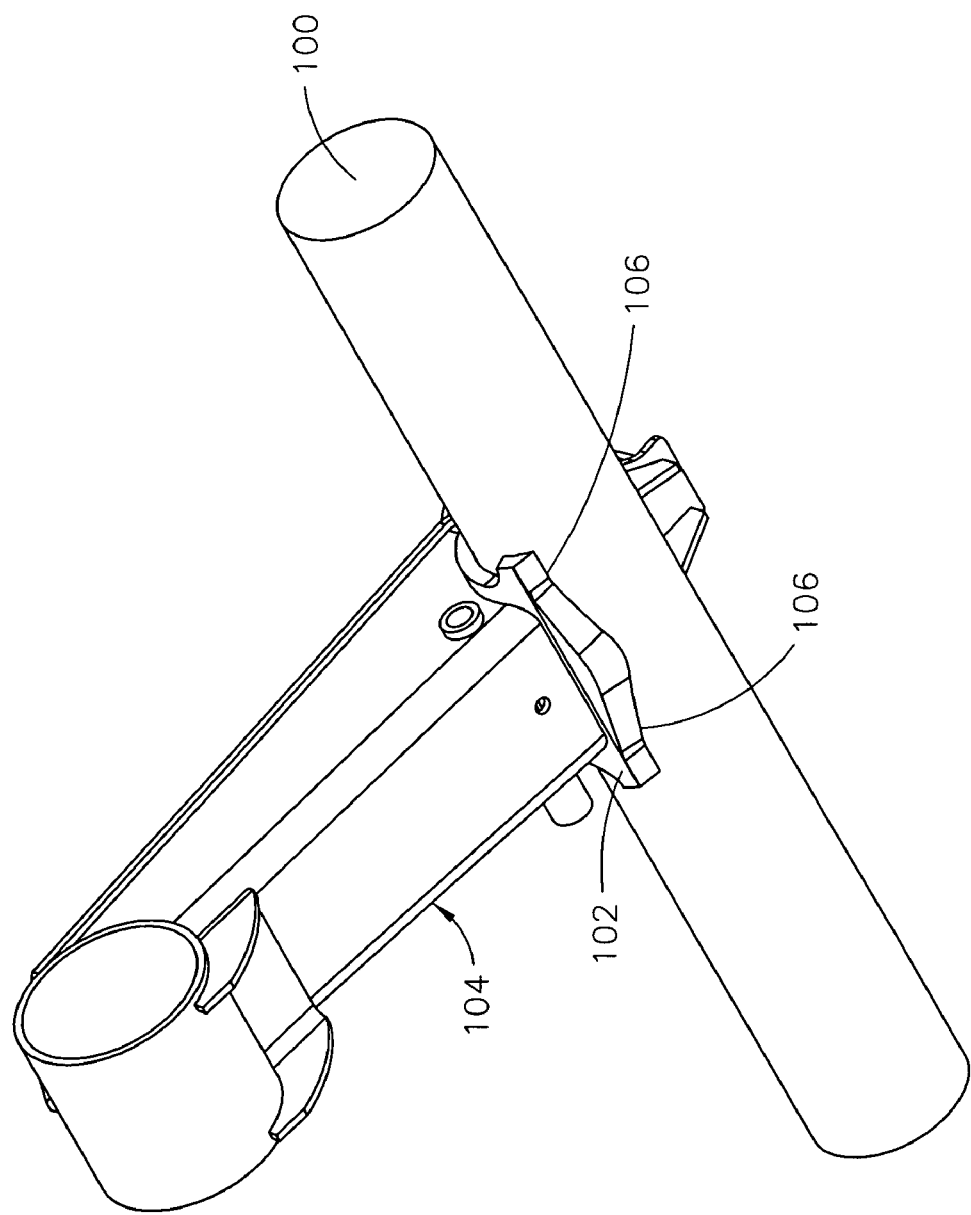
FIG. 2 is a partial view of related art showing weldment of an axle to a suspension arm.
Figure 3:
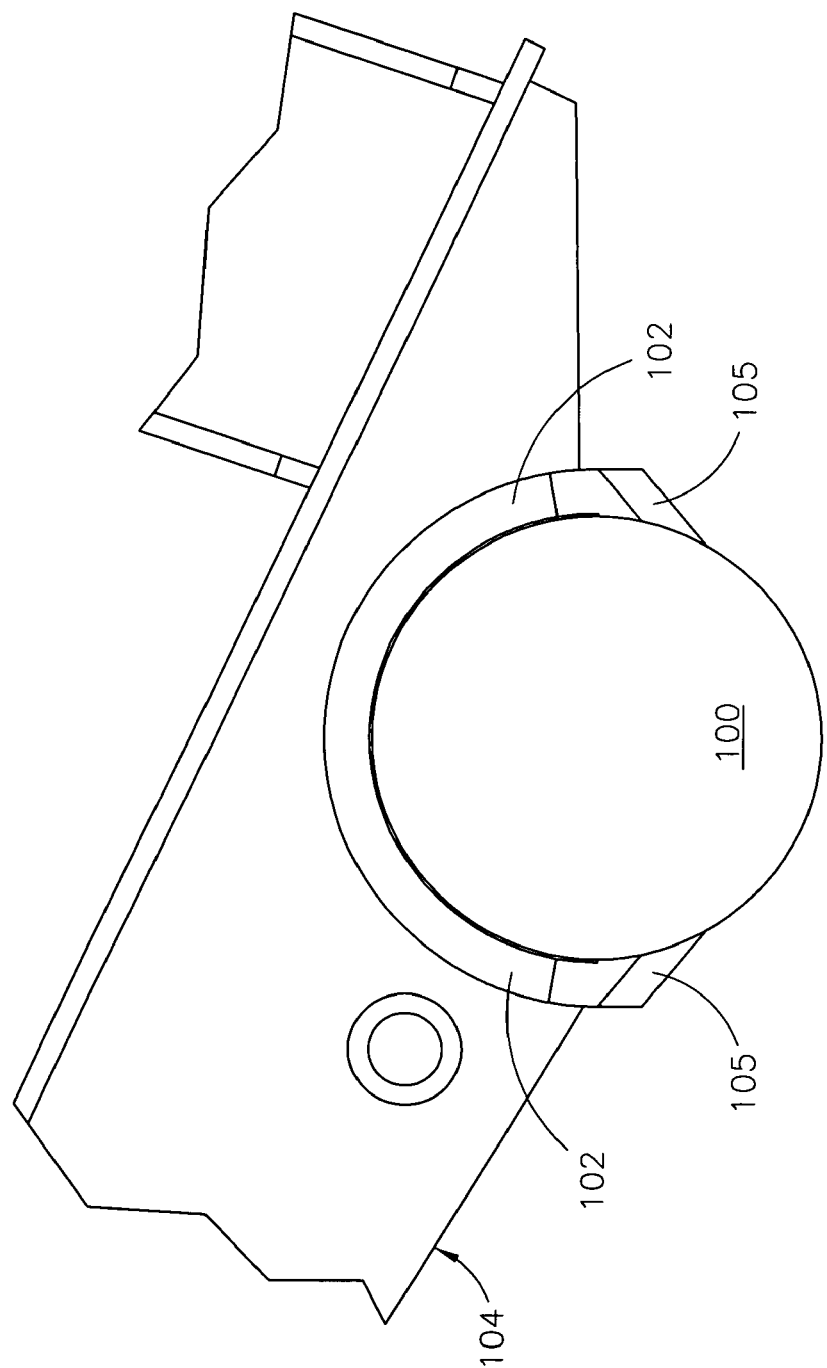
FIG. 3 is a close-up side view of related art showing an axle welded to a suspension arm.

Generally, axles are connected to suspensions by bolting or welding or combinations of both. To decrease the number of parts, weight and assembly time, weldment is often used to secure the axle 100 within an axle 102 shell mounted to the suspension 104, as generally shown in FIGS. 1 through 3, which depict a prior art suspension. As shown in these figures, to securely weld the axle 100 to the suspension 104, it is customary to provide a continuous weld 105 between the edges 106 of the axle shell 102 and axle 100. Heat generated by the welding process can weaken the metal of the axle 100 and axle shell 102. Moreover, installation is labor intensive and due to the length of the welds, disassembly for repair or replacement can be difficult. The instant inventive apparatus overcomes these problems inherent in the prior art.

Figure 4:
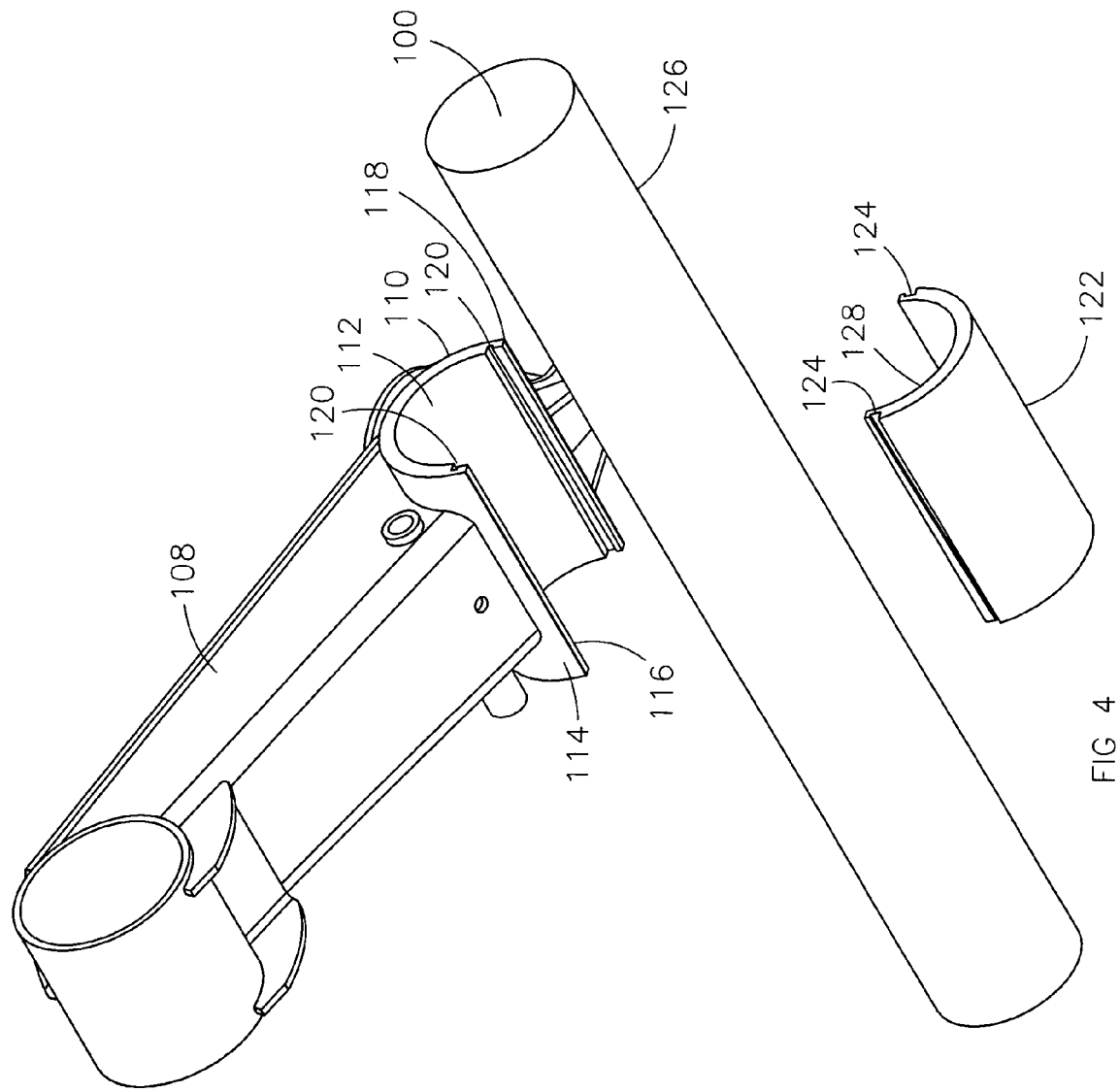
FIG. 4 is an exploded view of a wedge attachment for axle to suspension connection, according to an embodiment.

In the first embodiment of the invention, a suspension control arm 108 is provided with an integral axle shell 110 as shown in FIG. 4. The integral axle shell 110 can be either the upper portion or lower portion of the completed axle shell depending on whether utilized in an overslung or underslung axle system. The integral axle shell 110 is preferably semicircular and has an inner surface 112, an outer surface 114, a first edge 116 and a second edge 118. The axle shell 110 is formed in the suspension or connected to the suspension member by conventional means such as weldment of the outer surface 114 to a structural member of the suspension member arm 108. Substantially near each edge 116, 118 of the axle shell 110 a wedging structure 120 is provided. The wedging structure 120 may be one of several configurations which are discussed more specifically below.

An axle wedging shell 122 having similar dimensions and configuration as the axle shell 110 is provided. In the preferred embodiment the wedging shell 122 is semicircular and dimensioned to mate to the axle shell 110. The wedging shell 122 and the axle shell 110 have opposed wedging structures 120, 124 such that when the wedging shell 122 is inserted into the axle shell 110, a tight wedge connection is formed.

Generally, the wedging connection is created by frictionally engaging the wedging structures 120 of the axle shell 110 and the structures 124 of the wedging shell 122. In the preferred embodiment, the wedging structures 120 of the axle shell 110 is a pair of angled grooves along one length, one such groove near each of the lateral shell edges 116, 118. The wedging structures 124 of the wedging shell 122 is a pair of flanges, one positioned at each lateral edge of the wedging shell.

A slight increase in the angle $\alpha$ of the groove 120 in the axle shell 110 along its length creates a ramp, or wedge. To achieve the desired wedging action with the necessary force, a predetermined groove angle $\alpha$ differentiation is built into the axle shell 110. This is created by slightly increasing the distance between the groove and the distal edge 116, 118 of the axle shell along the length of the groove 120. The groove angle is replicated on both sides of the axle shell 110 along the length of the grooves 120. When the flanges 124 of the wedging shell 122 are inserted into the grooves 120 of the axle shell 110 and forced along the length of the grooves 120, a wedge or clamping force is created on the axle 100. It is to be understood that the wedging force is described as both a wedge force and a clamping force because the axle 100 is constructively clamped between the axle shell 110 and the wedge shell 122.

Figure 5:
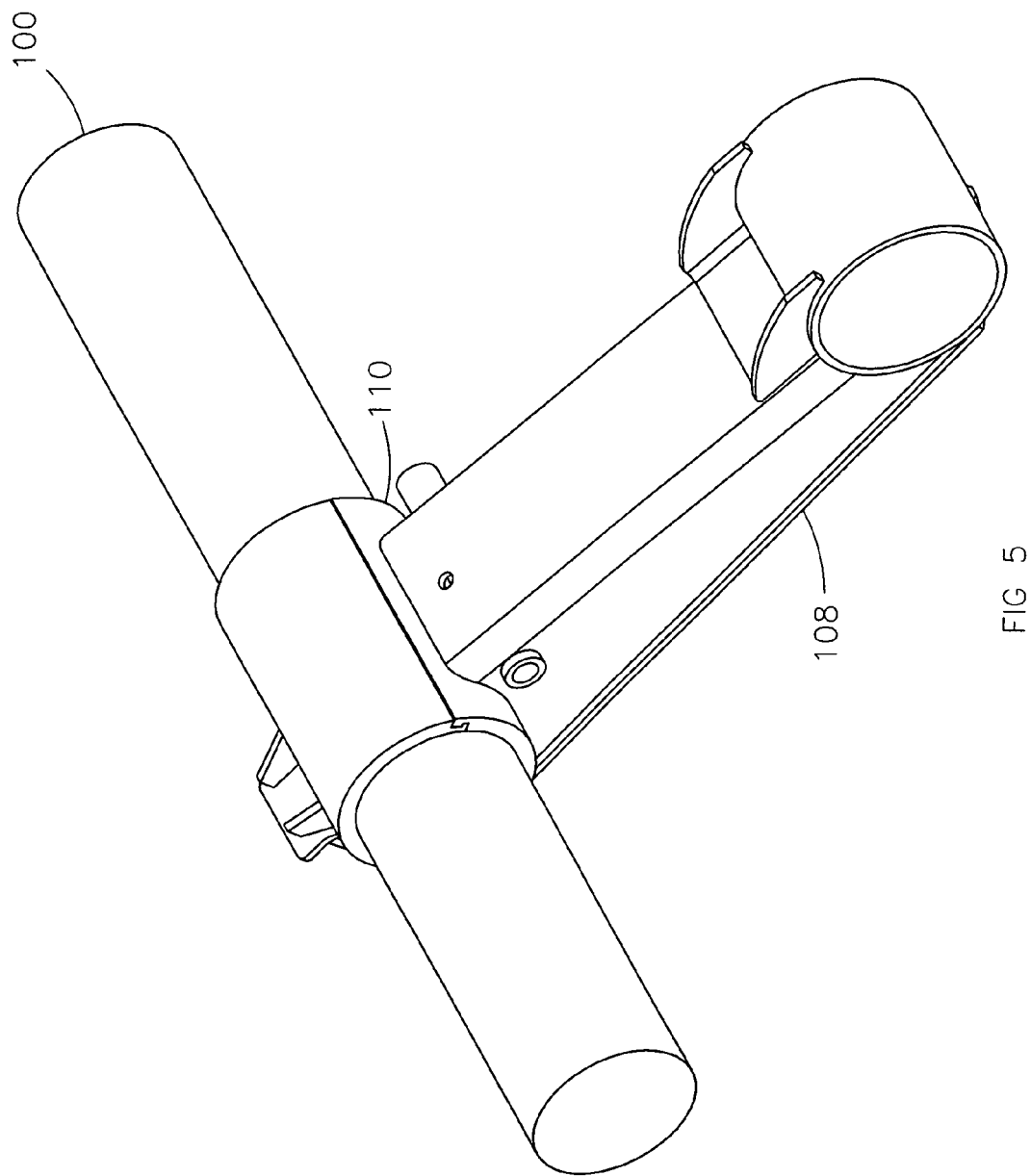
FIG. 5 is a perspective view of a wedge attachment for axle to suspension connection, according to an embodiment.
Figure 6:
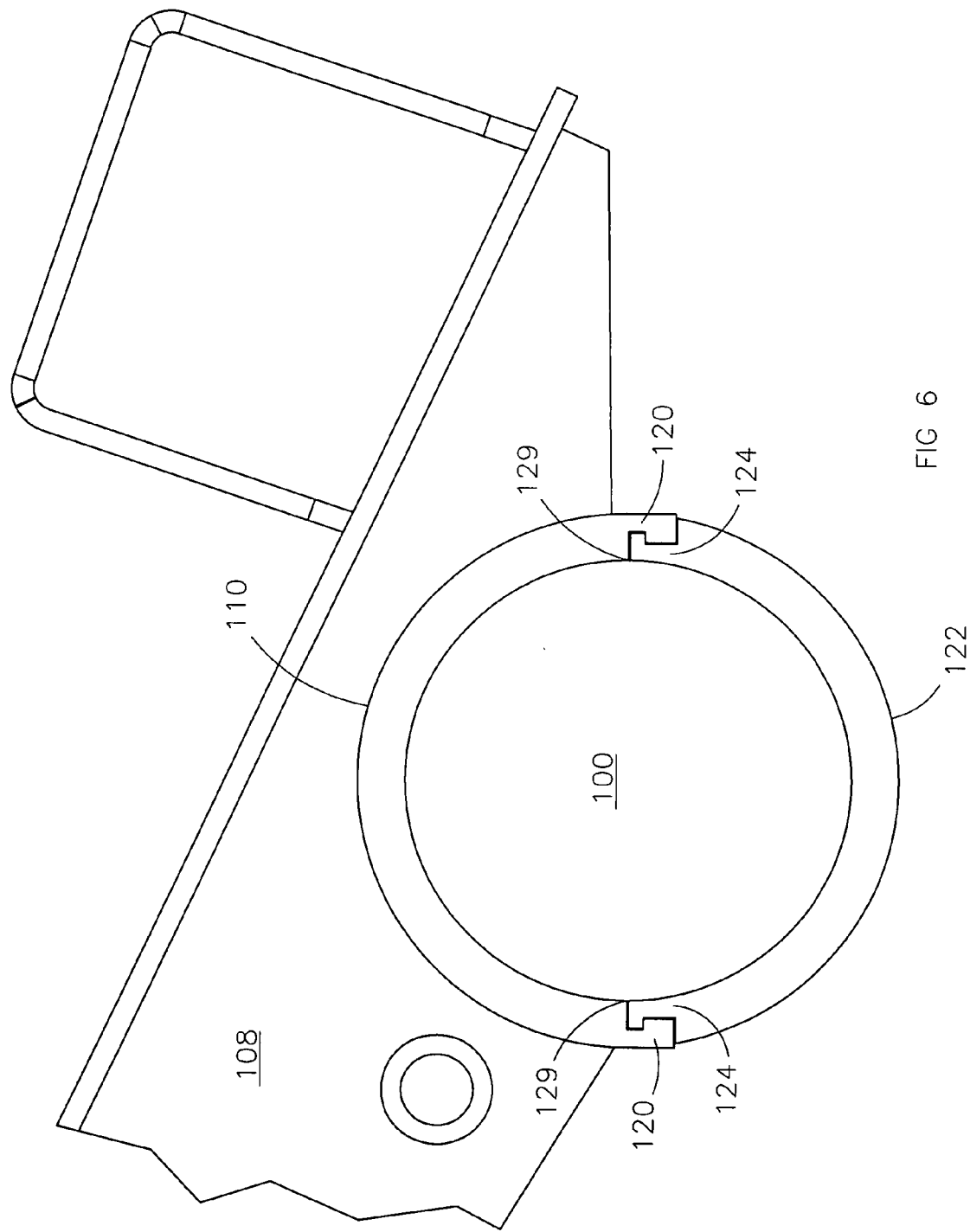
FIG. 6 is a side view of an axle attached to a suspension by wedge connection, according to another embodiment.

To assemble the actual attachment, an adhesive is placed on the outer surface 126 of the axle 100, the inner surface 112 of the axle shell 110, the inner surface 128 of the wedge shell 122, or some combination thereof. The axle 100 is then fitted into the axle shell 110 in the predetermined position and orientation, the flanges 124 of the wedge shell 122 are positioned within the grooves 120 of the axle shell 110, as described above, and forced into a closed position by moving the wedge shell flanges 124 laterally within the grooves 120 until the desired wedge force is achieved as shown in FIG. 5. The desired force will be controlled by varying the length of the grooves 120 and the angle 6. The wedge or clamping force is created by reducing the axle 100 and wedging shell 122 internal clearance and by clamping the axle 100 between the axle shell 110 and axle wedge 122. The adhesive limits undesirable axle rotation within the clamped region. It may be desirable to place a small weld at the juncture 128 of the axle shell 110, the wedging shell 122 and the axle 100 as shown in FIG. 6.

Figure 13:
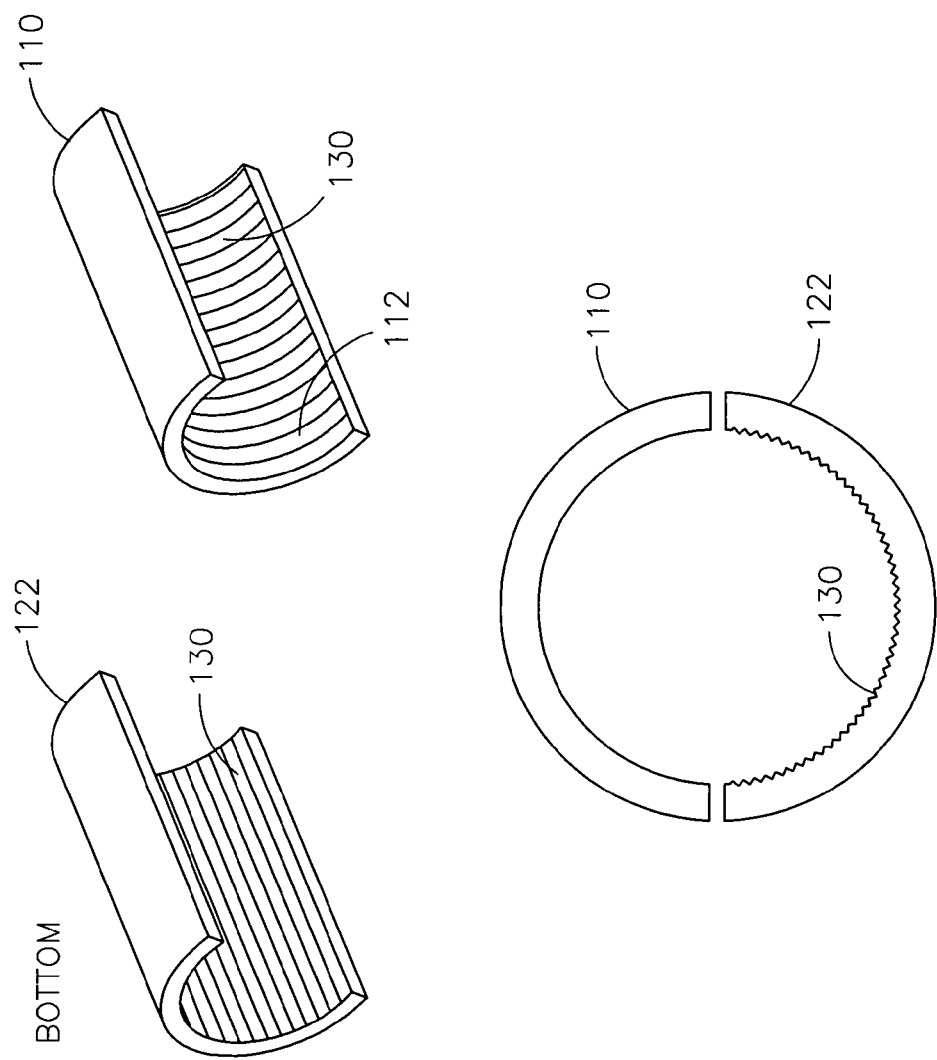
FIG. 13 is a partial perspective view of the inner surfaces of an axle shell and axle wedge, according to the embodiment of FIG. 11.

Because the wedging force can be so great and the tolerance is so close with this assembly, it is preferred that the inner surface 112 of the axle shell 110 and the inner surface 128 of the wedge shell 122 be provided with grooves, striations or other indentions 130 as shown in FIG. 13 to retain and hold adhesive as the wedge force is applied.

Figure 7:
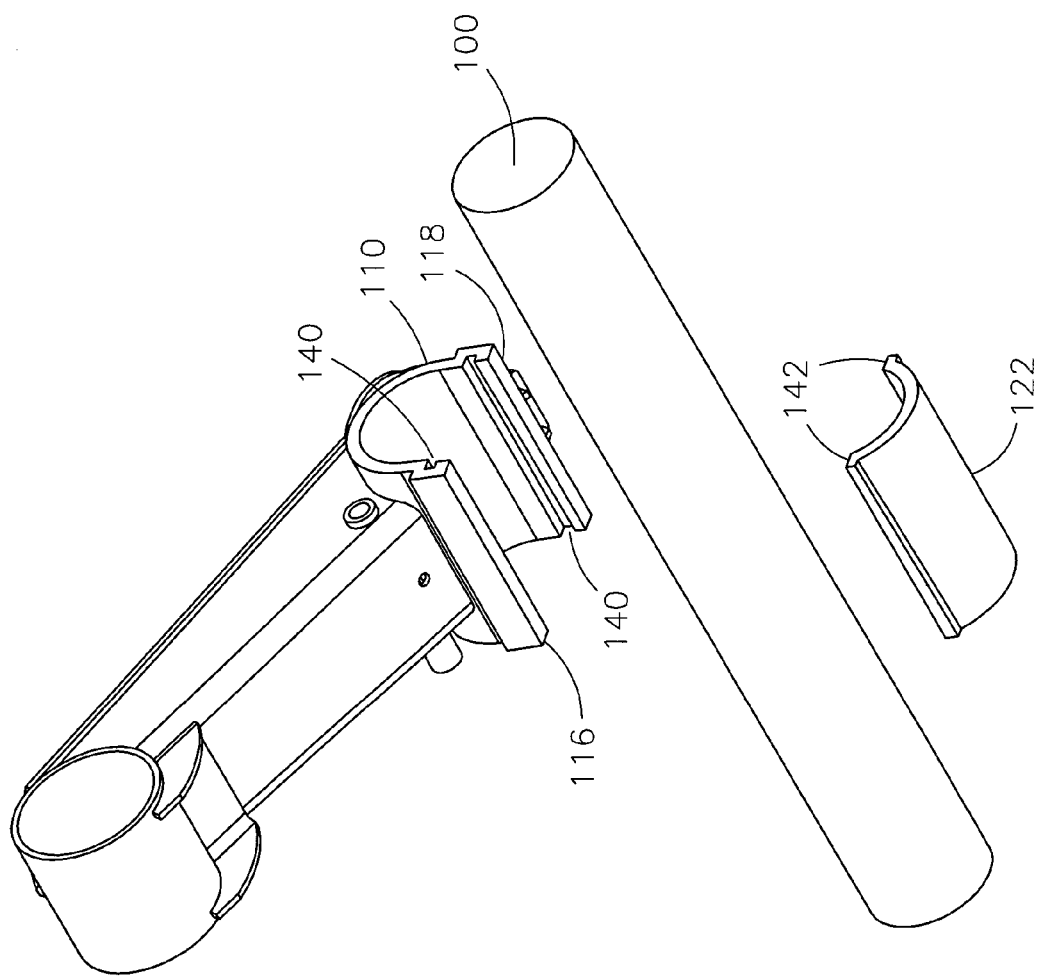
FIG. 7 is an exploded view of a wedge attachment for axle to suspension connection, according to another embodiment.
Figure 8:
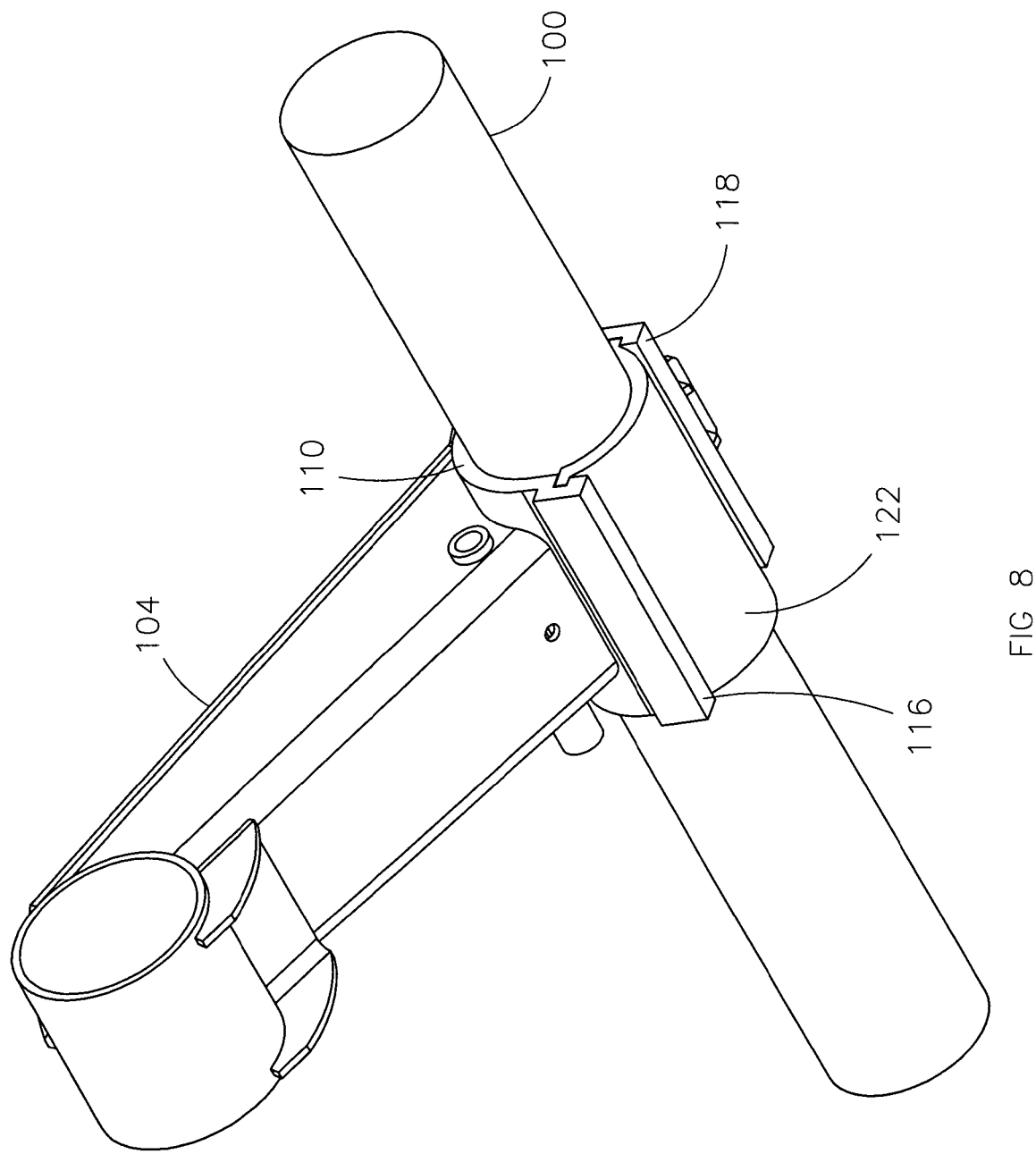
FIG. 8 is a perspective view of a wedge attachment for axle to suspension connection, according to another embodiment.
Figure 9:
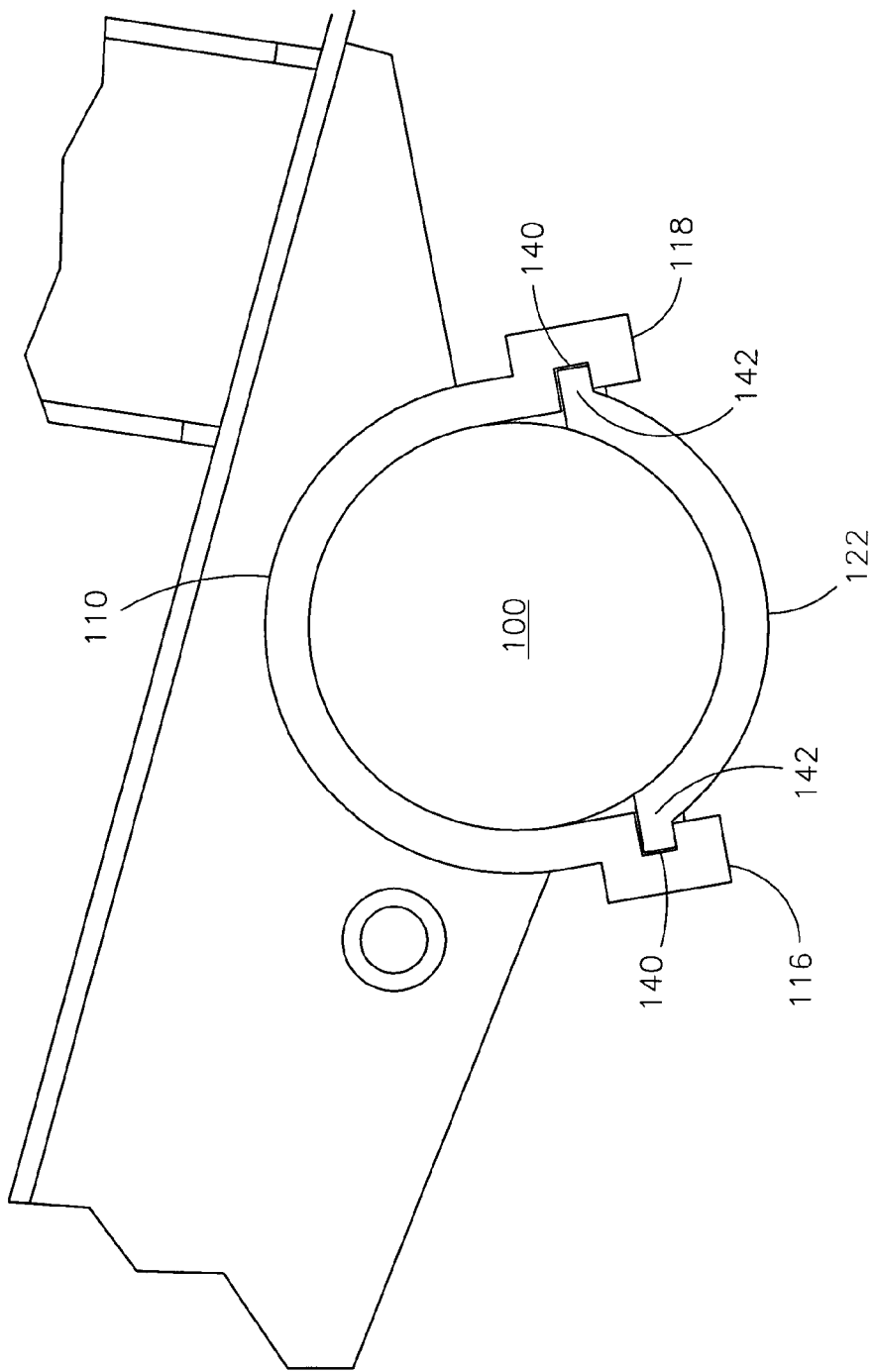
FIG. 9 is a side view of an axle attached to a suspension by wedge connection, according to an embodiment.

In a second embodiment of the invention, the wedging structure is a pair of grooves 140 created by manufacturing the axle shell 110 with a female receiving groove 140 substantially near both edges 116, 118. As generally shown in FIGS. 7 through 9, the wedging shell 122 includes a male member or flange 142 on its edges which are received in each groove 140 of the axle shell 110. This is best shown in FIG. 7. It is preferred that the grooves 140 are angled along their length by gradually increasing the distance between the axle shell edges 116, 118 and the grooves 140 over their length. The tolerances of the configuration are such that the angle is very small, generally less than five degrees relative to the axle shell edges 116, 118. It should be understood that other angles may be used, however.

It is to be understood that the drawings are representative only and that differing configurations of male to female combinations can be achieved by making minimal changes to the inventive device. For example, a wedge member may be provided with a female groove and a male flange, two female grooves or two male flanges as long as the opposite fastening piece is appropriately configured. The wedging structure may be integral the axle shell 110 and wedging shell 122 as shown in FIGS. 4 through 6, or formed on the outer surface of the axle shell and wedge as shown in FIGS. 7 through 9.

Figure 10:
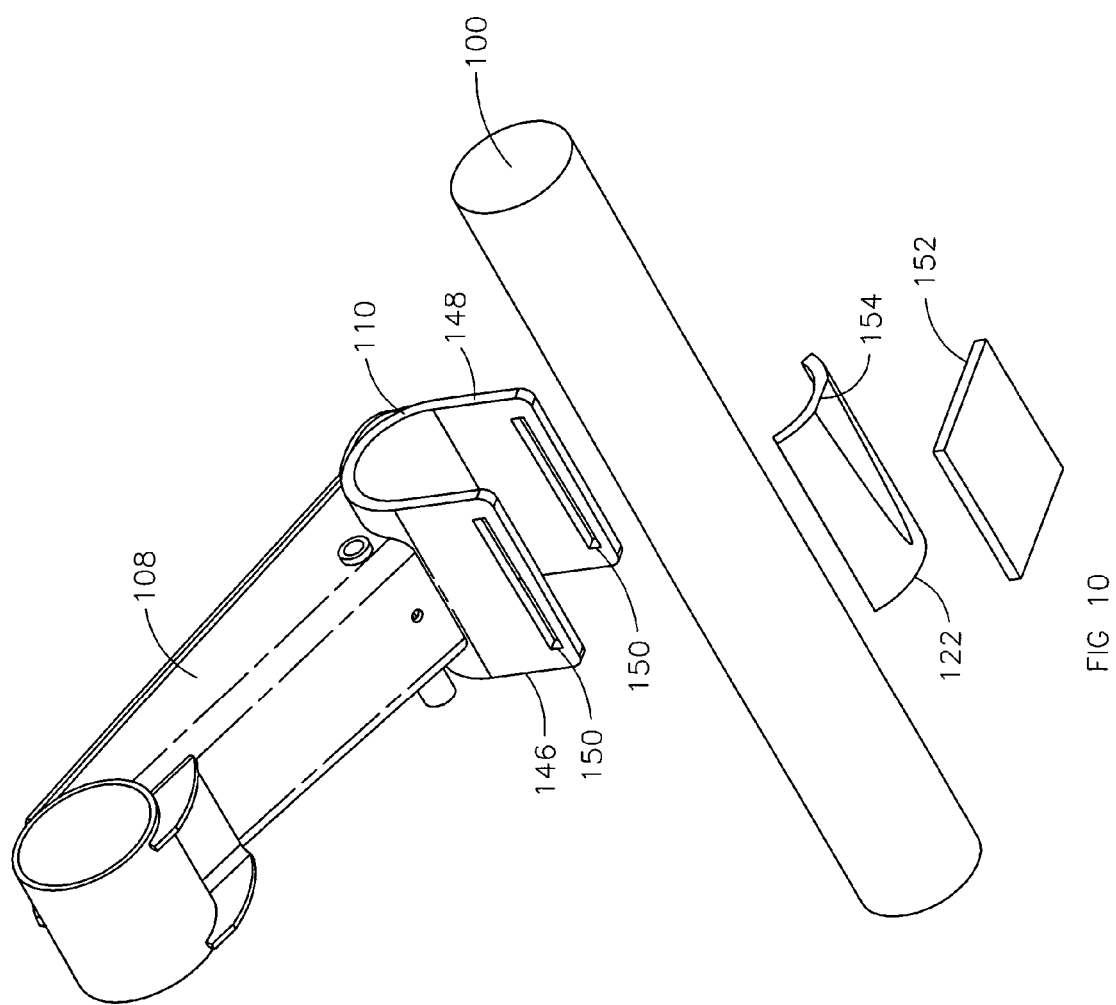
FIG. 10 is an exploded view of a wedge attachment for axle to suspension connection, according to another embodiment.
Figure 11:
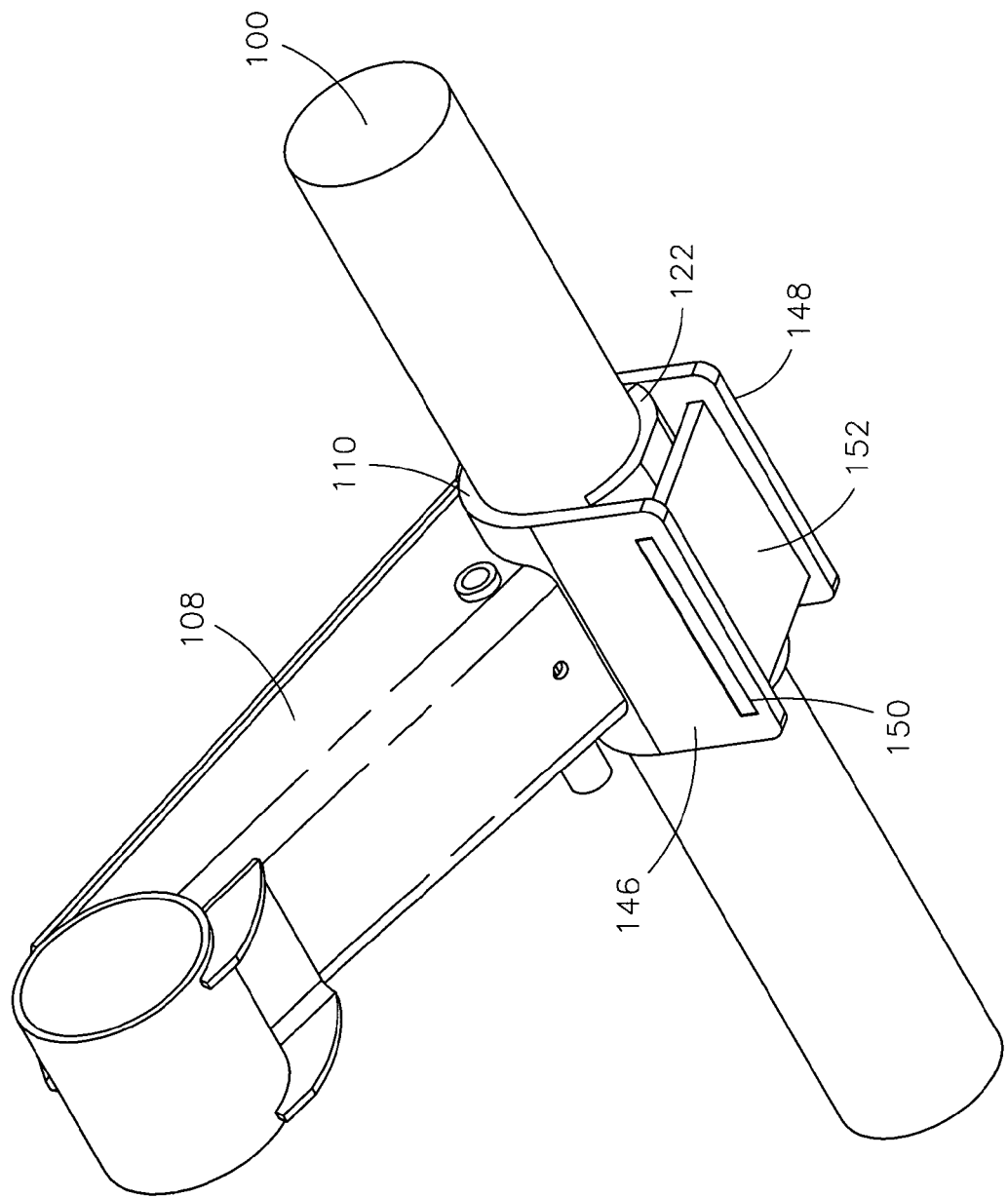
FIG. 11 is a perspective view of a wedge attachment for axle to suspension connection, according to another embodiment.
Figure 12:
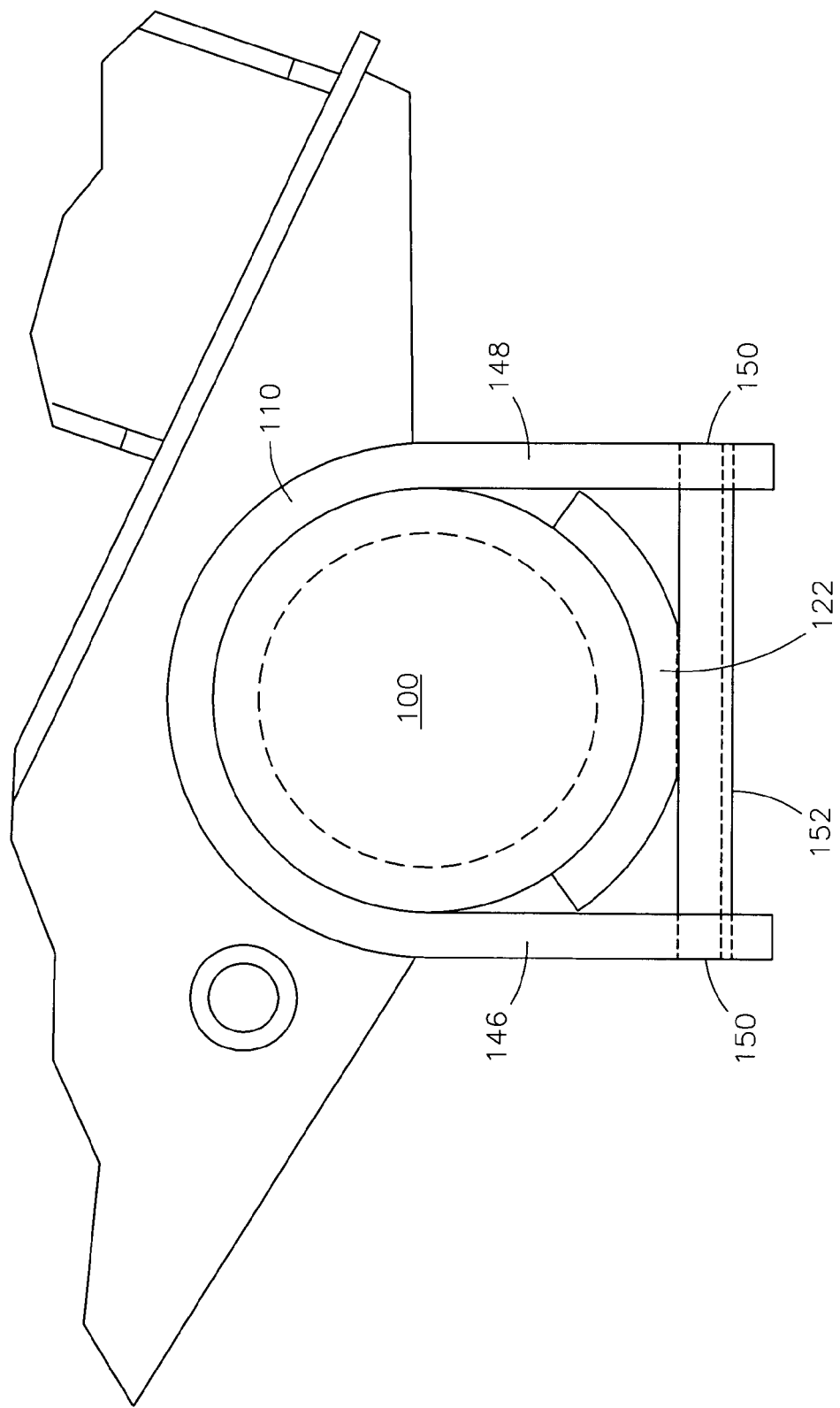
FIG. 12 is a side view of an axle attached to a suspension by wedge connection, according to the embodiment of FIG. 11.

In a third embodiment of the invention, shown in FIGS. 10 through 12, the axle shell 110 includes two arms 146, 148 projecting generally outward from the suspension control arm 108 such that when the axle 100 is positioned within the shell 110, the arms 146, 148 extend beyond the periphery of the axle. A slot 150 is formed in each arm 146, 148, and the slots 150 are in lateral alignment to receive a rigid retention plate 152. After the axle 100 is placed into the axle shell 110, the retention plate 152 is positioned within the slots 150 and underlying the axle 100. The retention plate 152 can be retained within the slots 150 by weldment or other fastening methods. Preferably, a minimal amount of welding would be required at the juncture of the retention plate 152 and the outer surface of each arm 146, 148 adjacent and over the slot 150. This orientation distances the heat created by weldment outboard the axle 100.

A wedging shell 122 is provided to be forced between the retention plate 152 and the axle 100. To create the desirable wedging effect, the outer surface of the wedge shell 122 must have a wedging surface 154. This can be achieved by grinding a wedge into the outer surface of the wedge shell 122 as shown in FIG. 10. As the wedge shell 122 is forced between the retention plate 152 and the axle 100 surface, the wedging surface 154 of the wedge shell 122 imparts directional wedging force to secure the axle between the wedge plate 152 and the axle shell 110. It is preferred that an adhesive be used in conjunction with this wedging configuration as more particularly outlined above. It is to be understood that a specific parabolic wedge surface is necessary to appropriately secure the axle 100 with this wedging arrangement. The specific parabolic wedge shape will be dictated by the axle size and overall suspension material composition, size and the like.

Figure 14:
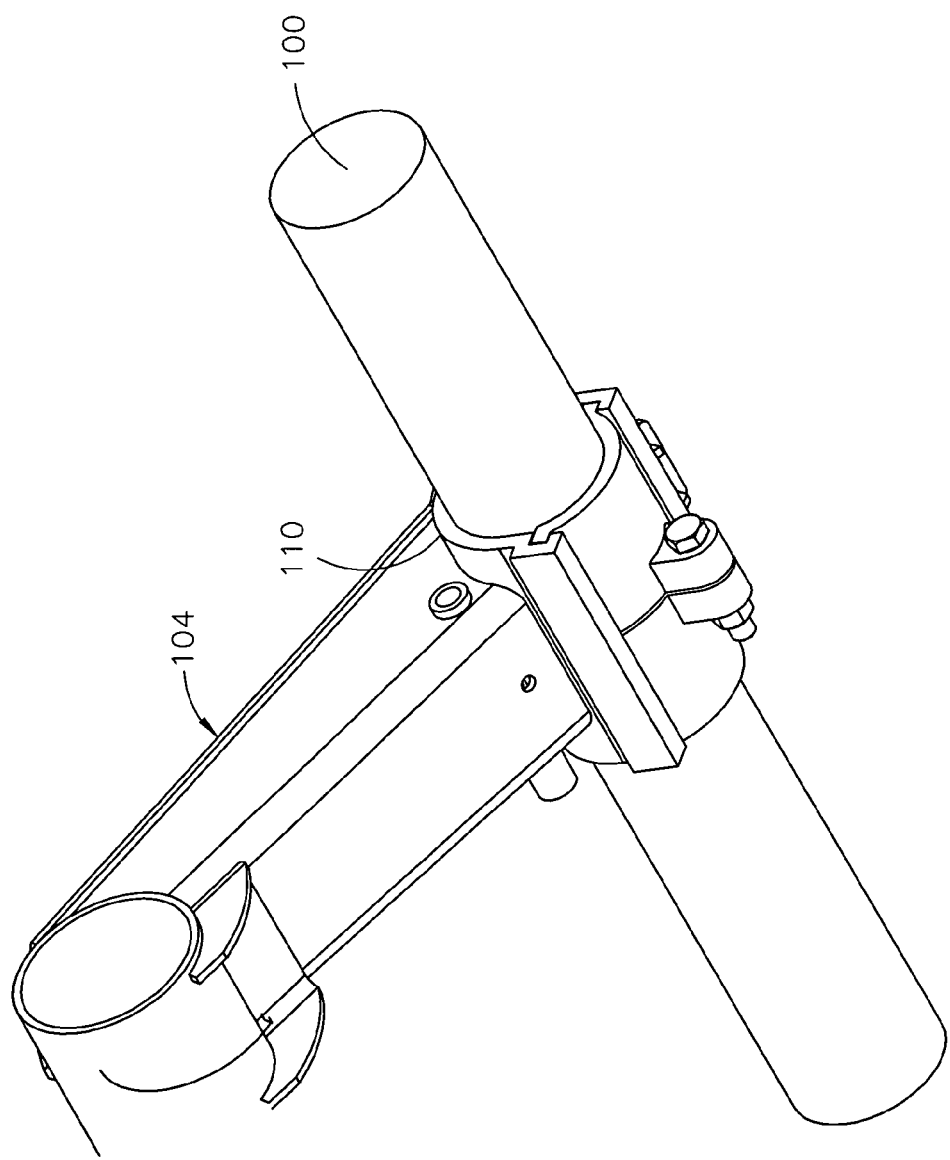
FIG. 14 is a perspective view of a wedge attachment for axle to suspension connection, according to yet another embodiment.
Figure 15:
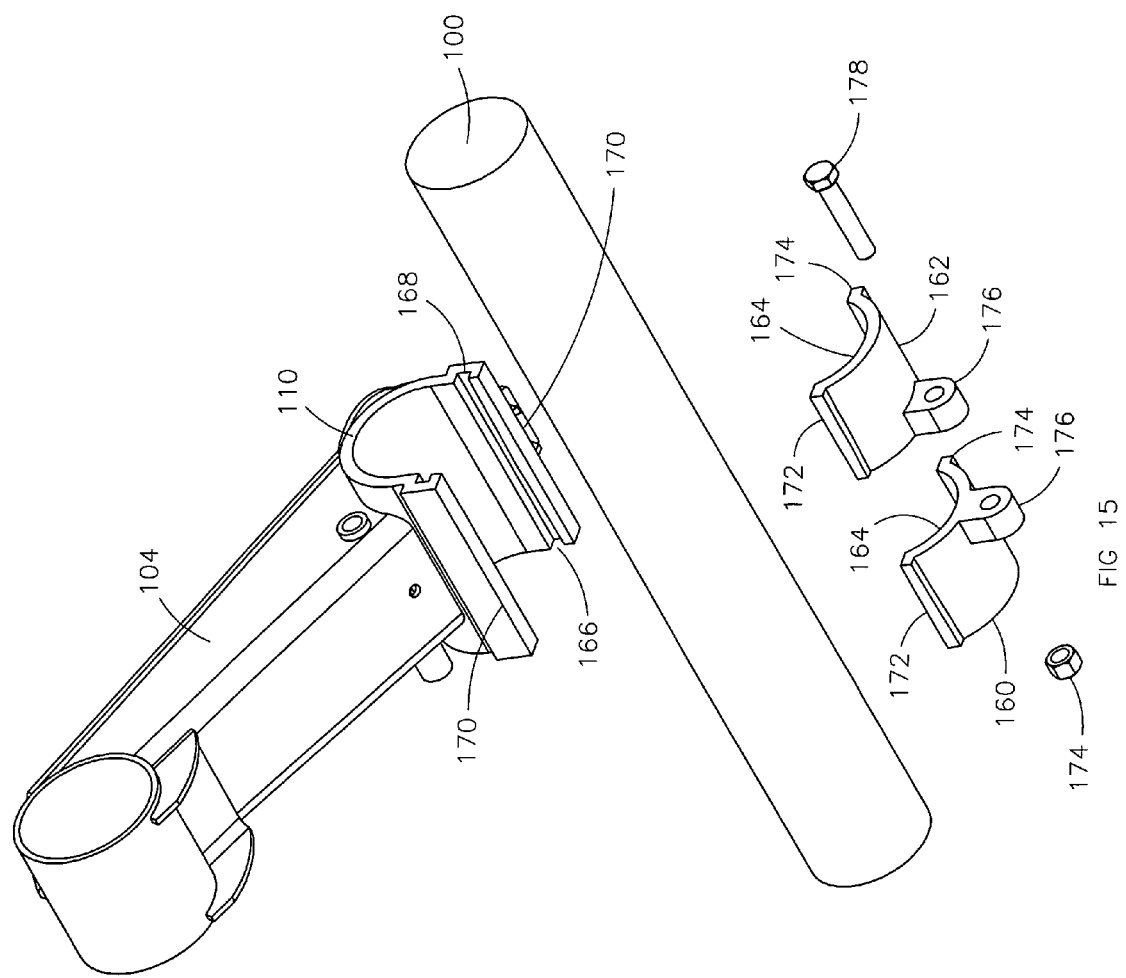
FIG. 15 is an exploded view of a wedge attachment of FIG. 14.
Figure 16:
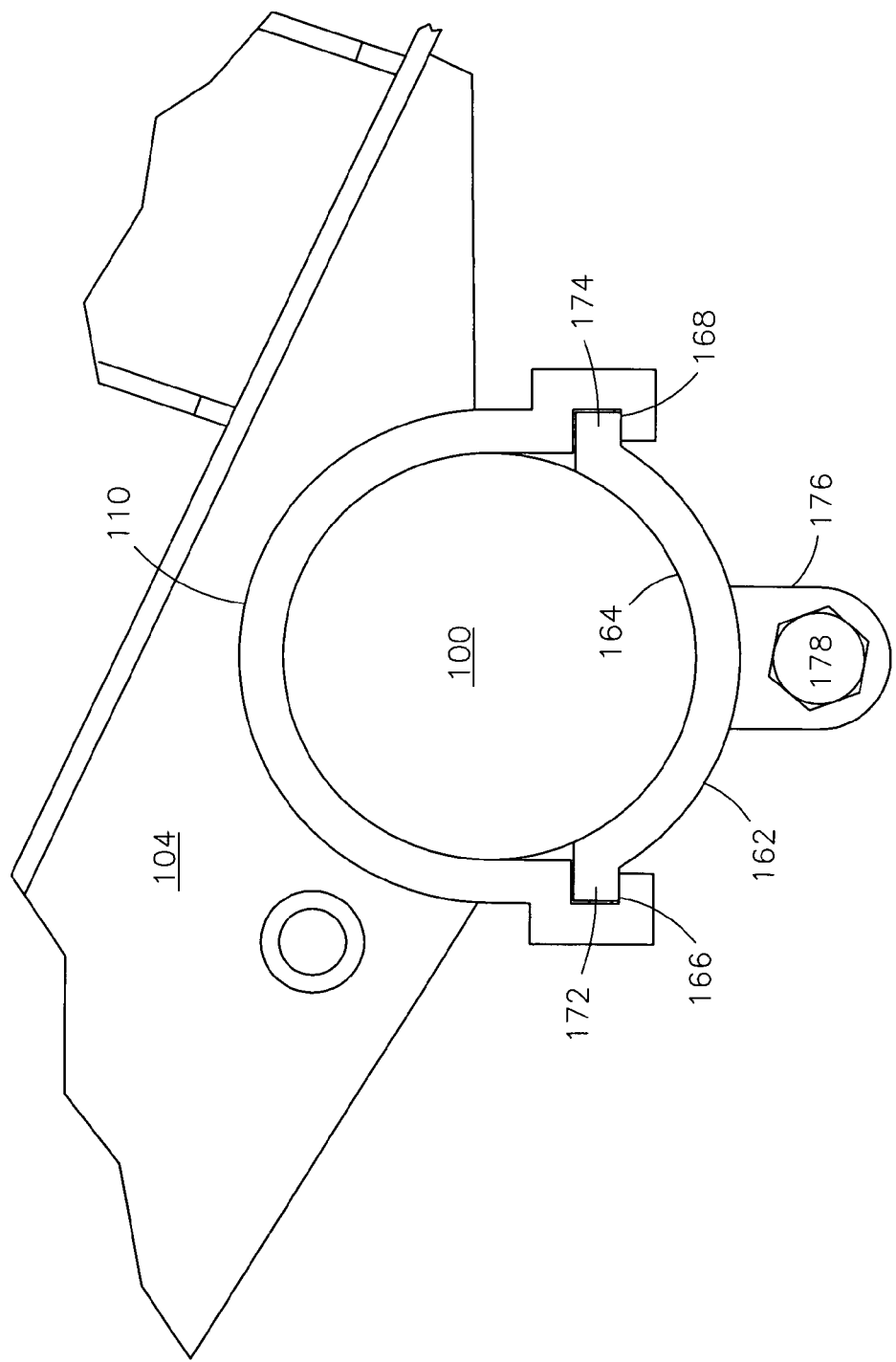
FIG. 16 is a partial side view of the wedge attachment of FIG. 14.

In yet another embodiment of the invention, the wedging shell 122 is formed from two separate pieces 160, 162 as best shown in FIG. 15. Each shell piece 160, 162 has an inner surface 164 conformed to the contour of the outer surface of the axle 100. Because the wedging shell 122 is two pieces 160, 162, two different angled grooves 166, 168 are provided in each side of the axle shell 110, preferably converging near a center point 170 of the axle shell 110. Flanges 172, 174 on each wedging shell piece 160, 162 are inserted into the respective angled grooves 166, 168 in the axle shell 110 and forcibly moved along the grooves 166, 168 creating the clamping forces previously described. It is preferable that each wedge shell piece 160, 162 is wedged generally inward so that the pieces are proximate a center point 170 of the axle shell 110 as shown in FIG. 14. As shown in FIGS. 14 and 16, each axle shell piece 160, 162 may have an outward projecting flange 176 with a fastening mechanism 178 whereby a bolt or similar fastener may be used to secure the two wedging shell pieces 160, 162 together. Because the grooves 166, 168 are generally angled toward the center 170 of the axle shell 110, once they are bolted or otherwise connected, the pieces 160, 162 cannot be moved outward without disconnection. The flanges 176 can also be welded together. Again, adhesive is preferably applied between the axle shell 110 and axle 100, the wedging shell pieces 160, 162 and the axle 100 or a combination thereof.

A variety of adhesive products may be suitable for use with the axle wedge assemblies described herein. One such commercially available adhesive is manufactured by 3M Corporation.

Changes may be made in the above methods, devices and structures without departing from the scope hereof. It should be noted that the matter contained in the above description and/or shown in the accompanying drawings should be interpreted as illustrative and not in a limiting sense. The following claims are intended to cover all generic and specific features described herein, as well as all statements of the scope of the best method, device and structure, which, as a matter of language, might be said to fall therebetween.

What is claimed is:

1. An apparatus for connecting an axle to a suspension, comprising:
  an axle shell coupled to a suspension member; the axle shell having an inner surface complementary to the axle for receiving the axle; the axle shell having first and second ends separated along an imaginary axis generally parallel to an axis of the axle when the axle is received by the axle shell inner surface; the axle shell having opposed sides; each axle shell side having one of an angled groove and a wedge flange extending between the first and second ends of the axle shell; and
  a wedging shell having an inner surface complementary to the axle for receiving the axle; the wedging shell having first and second ends separated along an imaginary axis generally parallel to the axis of the axle when the axle is received by the wedging shell inner surface; the wedging shell having opposed sides; each wedging shell side having one of a wedge flange and an angled groove extending between the first and second ends of the wedging shell;
  wherein the wedging shell is coupled to the axle shell by interaction between the wedge flanges and the angled grooves; and
  wherein the interaction between the wedge flanges and the angled grooves provides a clamping force between the axle shell and the wedging shell to maintain the axle in a desired position between the axle shell and the wedging shell.

2. The apparatus of claim 1, wherein the axle shell is a unitary member.

3. The apparatus of claim 1, further comprising adhesive between at least one of:
  the axle shell inner surface and the axle; and
  the wedging shell inner surface and the axle.

4. The apparatus of claim 1, wherein:
  the wedging shell inner surface includes indentations for receiving adhesive; and
  adhesive is between the wedging shell inner surface and the axle.

5. The apparatus of claim 1, further comprising welding coupled to at least one of:
  the axle shell and the axle;
  the wedging shell and the axle; and
  the axle shell and the wedging shell.

6. An apparatus for connecting an axle to a suspension, comprising:
- an axle shell coupled to a suspension member; the axle shell having an inner surface complementary to the axle for receiving the axle; the axle shell having first and second ends separated along an imaginary axis generally parallel to an axis of the axle when the axle is received by the axle shell inner surface; the axle shell having first and second opposed sides; and
- a wedging shell having an inner surface complementary to the axle for receiving the axle; the wedging shell having first and second ends separated along an imaginary axis generally parallel to the axis of the axle when the axle is received by the wedging shell inner surface; the wedging shell having opposed first and second sides;
- wherein the axle shell first side has one of an angled groove and a wedge flange extending between the first and second ends of the axle shell, and the wedging shell first side has the other of the angled groove and the wedge flange extending between the first and second ends of the wedging shell;
- wherein the axle shell second side has one of an angled groove and a wedge flange extending between the first and second ends of the axle shell, and the wedging shell second side has the other of the angled groove and the wedge flange extending between the first and second ends of the wedging shell;
- wherein the wedging shell is coupled to the axle shell by interaction between the wedge flanges and the angled grooves; and
- wherein the interaction between the wedge flanges and the angled grooves provides a clamping force between the axle shell and the wedging shell to maintain the axle in a desired position surrounded by the axle shell and the wedging shell.

7. The apparatus of claim 6, wherein the only clamping force in the apparatus is the clamping force provided by the interaction between the two angled grooves and the two wedge flanges.

8. The apparatus of claim 6, wherein:
- the axle shell first side has the angled groove;
- the wedging shell first side has the wedge flange;
- the axle shell second side has the angled groove; and
- the wedging shell second side has the wedge flange.

9. The apparatus of claim 6, wherein the axle shell is a unitary member.

10. The apparatus of claim 6, further comprising adhesive between at least one of:
- the axle shell inner surface and the axle; and
- the wedging shell inner surface and the axle.

11. The apparatus of claim 6, wherein:
- the wedging shell inner surface includes indentations for receiving adhesive; and
- adhesive is between the wedging shell inner surface and the axle.

12. The apparatus of claim 6, further comprising welding coupled to at least one of:
- the axle shell and the axle;
- the wedging shell and the axle; and
- the axle shell and the wedging shell.

13. An apparatus for connecting an axle to a suspension, comprising:
- a unitary axle shell coupled to a suspension member, the axle shell having an inner surface complementary to the axle for receiving the axle;
- a unitary wedging shell having an inner surface complementary to the axle for receiving the axle; and
- means for slidably coupling the unitary axle shell to the unitary wedging shell such that the axle is between and surrounded by the unitary axle shell and the unitary wedging shell, the means causing a clamping force between the unitary axle shell and the unitary wedging shell to maintain the axle in a desired position between and surrounded by the unitary axle shell and the unitary wedging shell.

14. The apparatus of claim 13, further comprising adhesive between at least one of:
- the axle shell inner surface and the axle; and
- the wedging shell inner surface and the axle.

15. The apparatus of claim 13, wherein:
- the wedging shell inner surface includes indentations for receiving adhesive; and
- adhesive is between the wedging shell inner surface and the axle.

16. The apparatus of claim 13, further comprising welding coupled to at least one of:
- the axle shell and the axle;
- the wedging shell and the axle; and
- the axle shell and the wedging shell.

* * * * *